US012626989B2

(12) United States Patent
Ogino et al.

(10) Patent No.: US 12,626,989 B2
(45) Date of Patent: May 12, 2026

(54) ELECTRICITY STORAGE MODULE

(71) Applicant: Panasonic Intellectual Property Management Co., Ltd., Osaka (JP)

(72) Inventors: Hirotaka Ogino, Osaka (JP); Chifumi Murayama, Osaka (JP); Jiro Muratsu, Osaka (JP); Koichi Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 620 days.

(21) Appl. No.: 17/635,960

(22) PCT Filed: Aug. 28, 2020

(86) PCT No.: PCT/JP2020/032582
§ 371 (c)(1),
(2) Date: Feb. 16, 2022

(87) PCT Pub. No.: WO2021/039957
PCT Pub. Date: Mar. 4, 2021

(65) Prior Publication Data
US 2022/0328922 A1 Oct. 13, 2022

(30) Foreign Application Priority Data

Aug. 30, 2019 (JP) ................................. 2019-158656
Sep. 30, 2019 (JP) ................................. 2019-178244
Jul. 31, 2020 (JP) ................................. 2020-130121

(51) Int. Cl.
*H01M 50/244* (2021.01)
*H01M 10/643* (2014.01)
(Continued)

(52) U.S. Cl.
CPC ....... *H01M 50/244* (2021.01); *H01M 10/643* (2015.04); *H01M 10/653* (2015.04);
(Continued)

(58) Field of Classification Search
CPC ............. H01M 50/213; H01M 50/218; H01M 50/244; H01M 10/653; H01M 10/643
See application file for complete search history.

(56) References Cited

U.S. PATENT DOCUMENTS 6,379,837 B1 4/2002 Takahashi et al.
2011/0293986 A1* 12/2011 Kozu ................ H01M 10/6563
429/120
(Continued)

FOREIGN PATENT DOCUMENTS

CN 109075410 A 12/2018
EP 1 030 387 A1 8/2000
(Continued)

OTHER PUBLICATIONS

First Office Action received in counterpart Chinese Patent Application No. 202080058727.9, dated Feb. 28, 2024, with partial English translation.
(Continued)

*Primary Examiner* — Jonathan G Jelsma
(74) *Attorney, Agent, or Firm* — Rimon P.C.

(57) ABSTRACT
An electricity storage module according to the present invention is provided with: a plurality of arranged cylindrical electricity storage devices; and an upper holder which holds the upper end parts of the plurality of electricity storage devices, while being provided with a plurality of containing parts that is formed of a thermoplastic resin. The upper holder comprises an upper support member which is formed of a thermosetting resin and supports electricity storage devices adjacent to each other, while being positioned between the adjacent electricity storage devices. In comparison to the thermoplastic resin, the thermosetting resin is not susceptible to deformation or melting event if heat is applied thereto.

10 Claims, 16 Drawing Sheets

(51) Int. Cl.

| | |
|---|---|
| *H01M 10/653* | (2014.01) |
| *H01M 50/213* | (2021.01) |
| *H01M 50/218* | (2021.01) |
| *H01M 50/627* | (2021.01) |

(52) U.S. Cl.
CPC ....... *H01M 50/213* (2021.01); *H01M 50/218* (2021.01); *H01M 50/627* (2021.01)

(56) References Cited

U.S. PATENT DOCUMENTS

| | | | | |
|---|---|---|---|---|
| 2012/0021260 A1* | 1/2012 | Yasui | .................. | H01M 10/615 |
| | | | | 429/71 |
| 2015/0349394 A1* | 12/2015 | Hayashida | ........ | H01M 10/6556 |
| | | | | 429/120 |
| 2016/0006007 A1* | 1/2016 | Takasaki | ............. | H01M 50/293 |
| | | | | 429/99 |
| 2016/0118633 A1 | 4/2016 | Hongo et al. | | |
| 2016/0149177 A1 | 5/2016 | Sugeno et al. | | |
| 2017/0098805 A1 | 4/2017 | Liu et al. | | |
| 2019/0131598 A1 | 5/2019 | Hwang et al. | | |
| 2019/0181400 A1 | 6/2019 | Nakasawa et al. | | |
| 2020/0194853 A1* | 6/2020 | Yoo | ..................... | H01M 10/613 |
| 2021/0159553 A1* | 5/2021 | Kurihara | ............. | H01M 10/658 |
| 2021/0167456 A1 | 6/2021 | Kurihara et al. | | |

FOREIGN PATENT DOCUMENTS

| | | | |
|---|---|---|---|
| EP | 2 423 928 A1 | 2/2012 |
| JP | 2000-306564 A | 11/2000 |
| JP | 2015-011956 A | 1/2015 |
| JP | 2015-201290 A | 11/2015 |
| JP | 2016-085914 A | 5/2016 |
| WO | 2018/003468 A1 | 1/2018 |
| WO | 2019/208217 A1 | 10/2019 |

OTHER PUBLICATIONS

International Search Report and Written Opinion issued in International Patent Application No. PCT/JP2020/032582 dated Nov. 2, 2020, with partial English translation.

Extended European Search Report dated Nov. 9, 2022 issued in the corresponding European Patent Application No. 20859255.0.

Japanese Office Action dated Aug. 6, 2024 issued in the corresponding Japanese Patent Application No. 2021-543035.

Japanese Office Action dated Jan. 14, 2025 issued in the corresponding Japanese Patent Application No. 2021-543035.

Office Action dated Oct. 31, 2025 issued in the corresponding European Patent Application No. 20 859 255.0.

\* cited by examiner

Figure 14

LOWER SIDE

UPPER SIDE

Figure 16

LOWER SIDE

UPPER SIDE

ELECTRICITY STORAGE MODULE

CROSS-REFERENCE OF RELATED APPLICATIONS

This application is the U.S. National Phase under 35 U.S.C. § 371 of International Patent Application No. PCT/JP2020/032582, filed on Aug. 28, 2020, which in turn claims the benefit of Japanese Application No. 2019-158656, filed on Aug. 30, 2019, Japanese Application No. 2019-178244, filed on Sep. 30, 2019, Japanese Application No. 2020-130121, filed on Jul. 31, 2020, the entire disclosures of which Applications are incorporated by reference herein.

TECHNICAL FIELD

The present disclosure relates to an energy storage module with an array of multiple cylindrical energy storage devices.

BACKGROUND

Conventional energy storage modules with an array of multiple energy storage devices are widely known. For example, Patent Literature 1 discloses an energy storage module in which the upper and lower end portions of an array of multiple cylindrical batteries are each held by a holder.

CITATION LIST

Patent Literature

Patent Literature 1: International Publication No. 2018/003468

SUMMARY

Technical Problem

In an energy storage module with multiple cylindrical batteries, if the holders soften or melt when one energy storage device goes into thermal runaway, the thermally runaway energy storage device will be close to or contact with the adjacent energy storage devices, increasing the risk of similar fires. In the energy storage module of Patent Literature 1, the holders are made of thermosetting resin to solve the problem of thermal runaway; however, curing resin is more difficult to process than, for example, thermoplastic resin, and tends to be larger when molded, while thermosetting resin has a higher specific gravity than other resins and tends to make the energy storage module heavier.

An object of the present disclosure is to provide an energy storage module capable of exhibiting increased reliability and having smaller and lighter holders.

Solution to Problem

An energy storage module of one aspect of the present disclosure includes: an array of multiple cylindrical energy storage devices; and a first holder that holds an end portion, located on one side, of each of the multiple energy storage devices and has multiple first containers made of a first material, wherein the first holder has a first support member that is located between the adjacent energy storage devices to support the adjacent energy storage devices, and that is made of a second material, and the second material has a property of being less likely to deform or melt even when heated than the first material.

Advantageous Effects of Invention

One aspect of the present disclosure can provide an energy storage module capable of having smaller and lighter holders and exhibiting excellent reliability.

BRIEF DESCRIPTION OF DRAWINGS

FIG. 14 is an oblique view of an energy storage module viewed from below to explain a process for manufacturing the energy storage module.

FIG. 16 is an oblique view of an energy storage module viewed from below to explain a process for manufacturing a conventional energy storage module.

DESCRIPTION OF EMBODIMENTS

Figure 1:
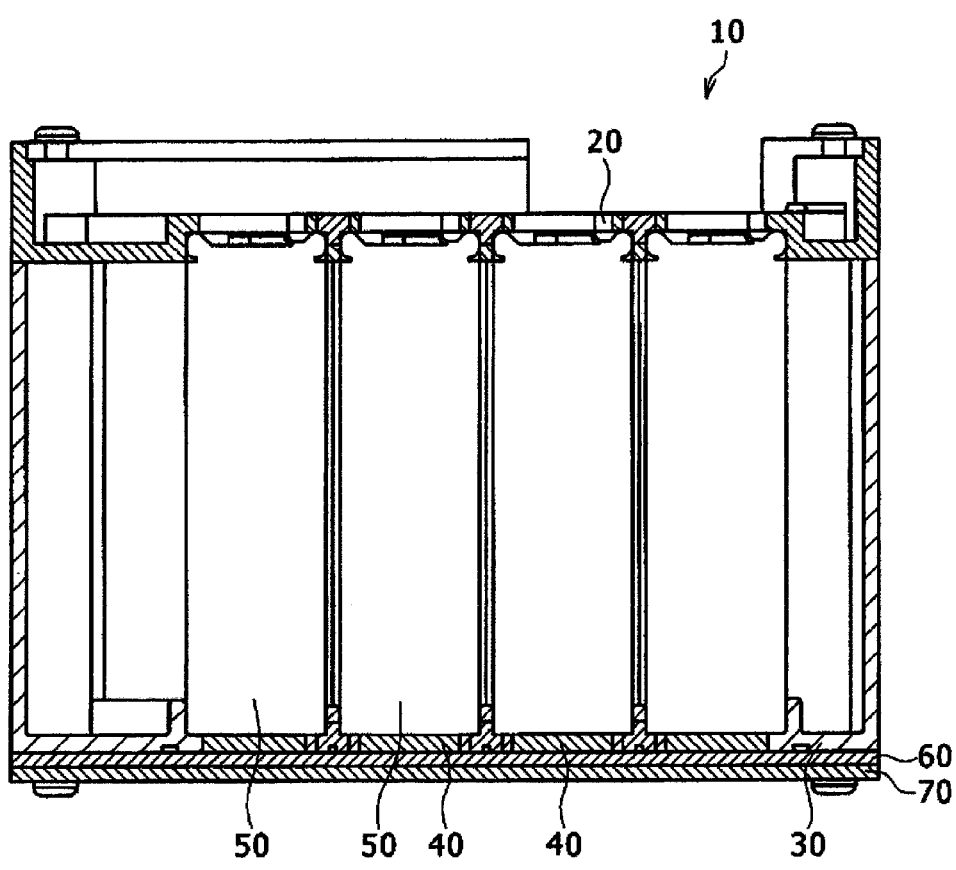
FIG. 1 is a side cross-sectional view of an energy storage module which is an example of an embodiment.

Embodiments of the present disclosure will be described below with reference to the drawings. The shapes, materials, and number of items described below are illustrated for the purpose of explanation, and can be changed as necessary according to the specifications of an energy storage module. In the following description, equivalent elements in all drawings are denoted by the same reference numeral.

An example of an embodiment, an energy storage module 10, will be described with reference to FIG. 1. FIG. 1 is a side cross-sectional view of the energy storage module 10. FIG. 1 is a cross-sectional view along line A1-A1 in FIG. 2, which will be described later.

The energy storage module 10 is used mainly as a power source for producing power. For example, the energy storage module 10 is used as a power source for motor-driven devices such as power tools, power-assisted bicycles, electric motorcycles, electric wheelchairs, electric tricycles, or electric carts. However, the energy storage module 10 is not used for specified applications, and may be used as a power source for a variety of electrical devices other than motor-driven devices, such as cleaners, radios, lighting devices, digital cameras, or video cameras, used indoors or outdoors.

The energy storage module 10 includes multiple cylindrical energy storage devices 50, an upper holder 20 as a first holder to hold the upper end portion of each energy storage device 50, and a lower holder 30 as a second holder to hold the lower end portion of each energy storage device 50. The details of the upper holder 20 and the lower holder 30 will be described later.

Each energy storage device 50 is a cylindrical lithium-ion secondary battery. The energy storage device 50 includes, for example, an electrode group in which a positive electrode strip and a negative electrode strip are coiled together with a separator strip therebetween, a cylindrical outer can containing the electrode group with an electrolyte, a sealing body that seals an opening of the outer can in an insulated state, a foil-like positive electrode lead that electrically connects the positive electrode to the sealing body, and a negative electrode lead that electrically connects the negative electrode to the outer can. An insulating gasket is placed between the outer periphery of the sealing body and the inner periphery of the opening of the outer can.

An annular groove is formed on the outer periphery of the outer can on the opening side. To this groove, an annular protrusion is formed on a corresponding inner periphery of the outer can. The gasket and the sealing body are placed on this annular protrusion in the outer can. In addition, an opening end of the outer can is swaged so that it falls toward the inside of the outer can while the gasket is placed inside. The opening of the outer can is sealed when the sealing body is sandwiched vertically (in the direction of the height of the energy storage devices 50) between the swaged opening end and the protrusion through the gasket.

The sealing body may be provided with a current interruption mechanism (CID) or an exhaust valve that bursts when the pressure inside the outer can reaches a predetermined level or higher. An insulating plate may be provided between the electrode group and the bottom of the outer can or between the electrode group and the protrusion (groove) to insulate the electrode group from the outer can. In the case where an insulating plate is provided, the positive electrode lead may extend through a through hole formed in the insulating plate. The negative electrode lead may extend through the through hole formed in the insulating plate or bypass the insulating plate.

In the energy storage device 50, the positive electrode terminal as a first terminal is formed on the top surface of the sealing body, and the negative electrode terminal as a second terminal faces the upper end portion (swaged opening end) of the outer can. The electrode group may be connected so that the outer can functions as the positive electrode terminal and the sealing body functions as the negative electrode terminal.

The energy storage devices 50 are packed in the energy storage module 10 in the densest manner for safety reasons, and the adjacent energy storage devices 50 are arranged almost close to each other. The energy storage devices 50 are arranged in such a way that, for example, six energy storage devices 50 surround one energy storage device 50 in a plan view. Note that the energy storage device 50 may be a nickel metal hydride battery or a capacitor, instead of a lithium-ion secondary battery.

Each energy storage device 50 is placed on the top of a heat-conductive material 40. The heat-conductive material 40 is made of silicon, a two-component hardening material, containing a metal oxide (e.g., aluminum oxide or zinc oxide), metal nitride (e.g., aluminum nitride or boron nitride), metal oxynitride (e.g., aluminum oxynitride), or the like. An insulating layer 60 may be a silicon sheet containing a heat-conductive filler. A heat exchange member 70 may be a water-cooled pipe, an air-cooled fin, a refrigerant cooling pipe, a panel heater, a sheet heater, or the like.

Figure 2:
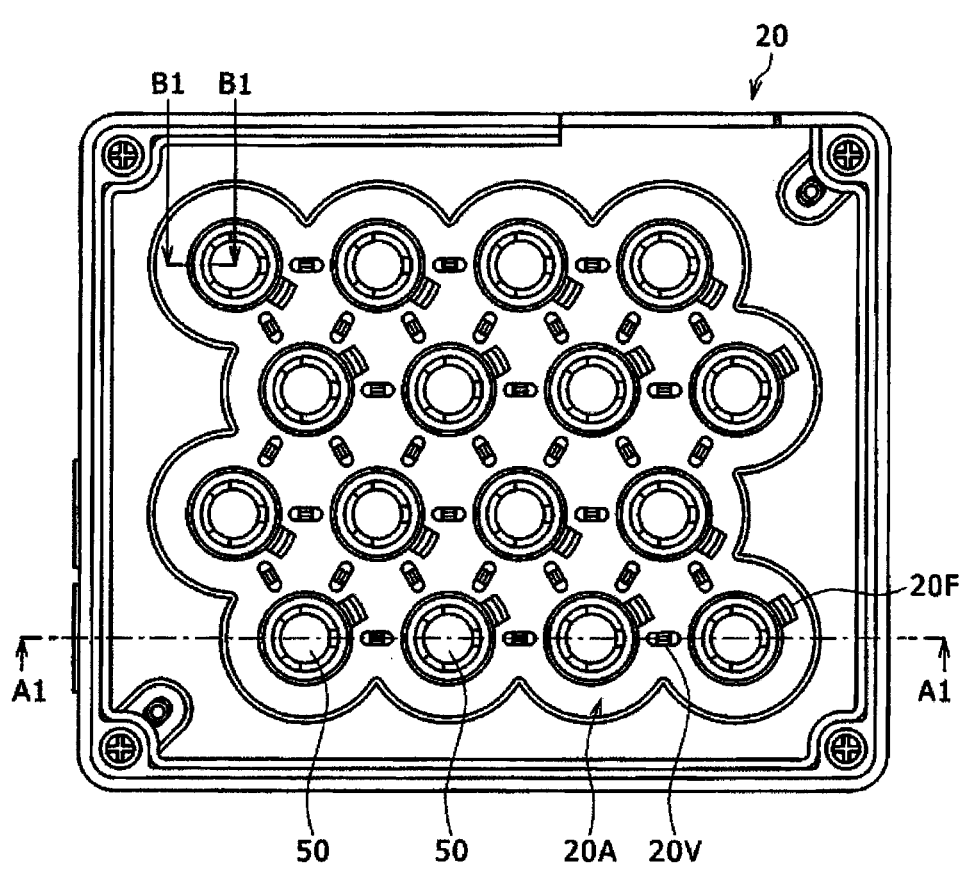
FIG. 2 is a plan view of an upper holder.
Figure 3:
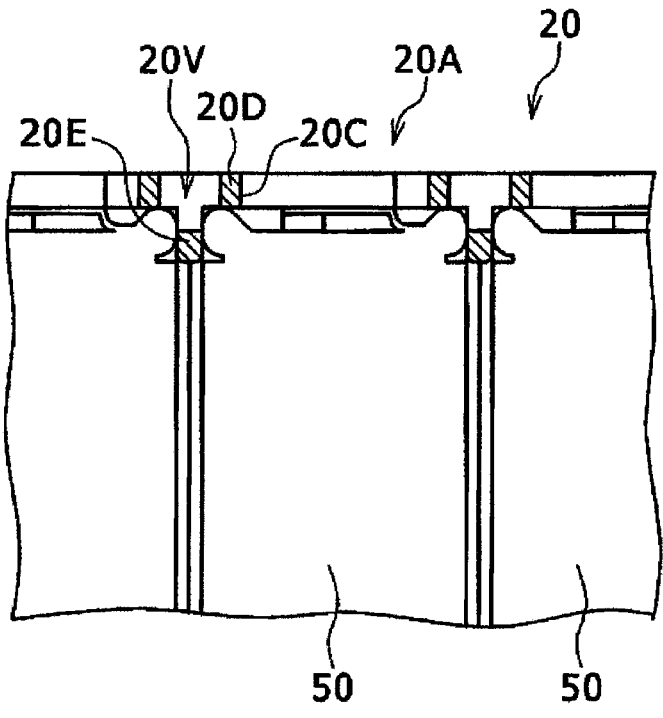
FIG. 3 is a side cross-sectional view of the upper holder.

The upper holder 20 will be described with reference to FIGS. 2 and 3. FIG. 2 is a plan view of the upper holder 20. FIG. 3 is a portion of a cross-sectional view along line A1-A1 shown in FIG. 2. In FIGS. 2 and 3, an upper support member 25 is omitted for clarity of explanation.

The upper holder 20 has the upper support member 25 (see FIG. 5), which will be described in detail later. The upper holder 20 is made of a first material. Thermoplastic resin is used as the first material. Thermoplastic resin is a resin that softens when heated to its glass transition point or melting point, and hardens when cooled again. Examples include polyethylene, polypropylene, polyamide, and ABS, which are broadly classified into general-purpose plastics and engineering plastics.

The thermoplastic resin, the first material, contains, for example, at least one of a heat-absorbing filler and a thermally conductive filler, preferably both a heat-absorbing filler and a thermally conductive filler. The heat-absorbing filler exerts a heat-absorbing effect during pyrolysis, and specific examples include aluminum hydroxide and sodium bicarbonate. Examples of thermally conductive fillers include metal oxides (e.g., aluminum oxide and zinc oxide), metal nitrides (e.g., aluminum nitride and boron nitride), and metal oxynitrides (e.g., aluminum oxynitride).

As shown in FIGS. 2 and 3, the upper holder 20 has multiple containers 20A to contain the respective upper end portions of the energy storage devices 50. Each container 20A has an opening 20C, an overhang 30B, a partition 20E, a void 20V, a connection hole 20F, and a groove 20G.

The opening 20C is a portion where a portion of the upper end portion of the energy storage device 50 is exposed. The opening 20C has a circular shape, for example. The positive electrode lead of a current collector plate (not shown in the drawing) disposed on the top surface of the upper holder 20 may be inserted into the opening 20C, and the positive electrode lead may be bonded to the positive electrode terminal of the energy storage device 50.

An overhang 20D extends above the top surface of the energy storage device 50 to encircle the opening 20C. The overhang 20D is disposed around the opening 20C and faces the periphery of the top surface of the energy storage device 50. The overhang 20D is formed close to the top surface of the energy storage device 50 and may be in contact with the top surface of the energy storage device 50 (e.g., the swaged opening end of the outer can). The partition 20E lies along the outer periphery of the energy storage device 50. The partition 20E lies near and may be in contact with the outer periphery of the energy storage device 50.

The connection holes 20F are aligned in the circumferential direction like the voids 20V in each energy storage device 50. The connection holes 20F expose a portion of the opening end of the outer can from the upper holder 20. The negative electrode lead from the current collector plate may be inserted into each connection hole 20F and joined to the opening end of the outer can, which is the negative electrode terminal. The connection hole 20F is located between adjacent voids 20V in the circumferential direction of one energy storage device 50F, and includes the farthest point from the adjacent energy storage device 50 in this circumferential direction. This configuration prevents the negative electrode lead of the current collector plate from electrically connecting to other energy storage devices 50. In the case where the negative electrode terminal is formed at the bottom of the outer can, the connection holes 20F are not necessary.

The void 20V is a space to be filled with the second material, which will be described in detail later. The second material filled in the void 20V hardens to form the upper support member 25. Each void 20V lies between adjacent containers 20A. More precisely, it lies along an axis connecting the center lines of the adjacent containers 20A. Such arrangement of the voids 20V inhibits the approach of a thermally runaway energy storage device 50 to the energy storage device 50 nearest to the thermally runaway energy storage device 50, so that the second material suppresses it. The voids 20V are placed in multiple locations aligned in the circumferential direction for a single energy storage device 50.

The void 20V consists of a horizontal void formed by notching a portion of the overhang 20D, and a vertical void that is formed by notching the upper end portion of the partition 20E and communicates with the horizontal void. The top surface of the upper holder 20 has an inlet from which the second material to define the void 20V and form the upper support member 25 is injected. Note that this inlet does not necessarily have to be formed in the top surface of the upper holder 20, and may be formed in the side surface of the upper holder 20. The opening area of the inlet does not have to be the same as the cross-sectional area of the horizontal void, and the opening area of the inlet may be smaller than the aforementioned cross-sectional area.

The length of the horizontal void in the direction along the cut line is smaller than the gap between adjacent openings 20C and larger than the gap between adjacent energy storage devices 50. The length of the horizontal void in the direction perpendicular to the axis in the horizontal plane is approximately the same as the gap between the adjacent energy storage devices 50. The length in the vertical direction of the vertical void is approximately the same as the gap between the adjacent energy storage devices 50.

Figure 4:
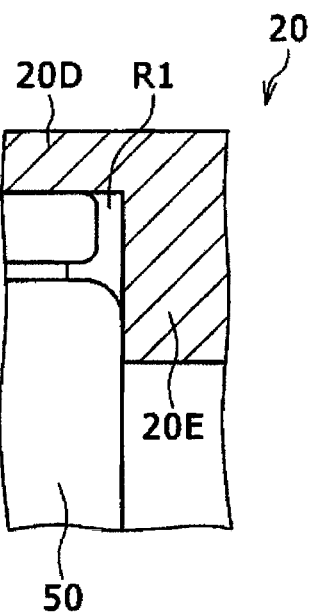
FIG. 4 is a side cross-sectional view of an energy storage module which is another example of the embodiment.

An energy storage device 50 that is another example of the embodiment will now be described with reference to FIG. 4. FIG. 4 is a cross-sectional view along line B1-B1 shown in FIG. 2 of another embodiment of an energy storage device 50.

In the energy storage device 50, the diameter of a part of the upper end portion is smaller than the diameter of another part of the energy storage device 50. For example, in a conceivable configuration of such an energy storage device 50, in the outer can, the diameter of a portion closer to the opening end with respect to the groove is processed to be smaller than the diameter of a portion closer to the bottom with respect to the groove. A space R1 defined by the outer periphery of the portion with the smaller diameter and the partition 20E communicates with the void 20V. Consequently, the thermosetting resin in the void 20V flows into the space R1. The thermosetting resin flowing into the space R1 acts as an adhesive to bond and fix the energy storage device 50 and the upper holder 20 together.

In the outer can of the energy storage device 50, making the diameters of portions closer to the opening end and bottom with respect to the groove the same, and providing communication between the void 20V and the space defined by the groove and the partition 20E constitutes a structure in which the energy storage device 50 is supported only by the upper support member 25 in the void 20V of the energy storage device 50 of the upper support member 25, improving support performance. However, making the diameter smaller on the opening end side than the bottom side with respect to the groove tends to increase the amount of the second material to be in contact with the energy storage device 50 in the direction of the height of the energy storage device 50. Note that the same effect may be obtained by providing, in the portion contained in the lower holder 30 located at the other end of the energy storage device 50 (especially the bottom portion of the outer can), which will be described later, a part where the diameter is smaller than the other part.

Figure 5:
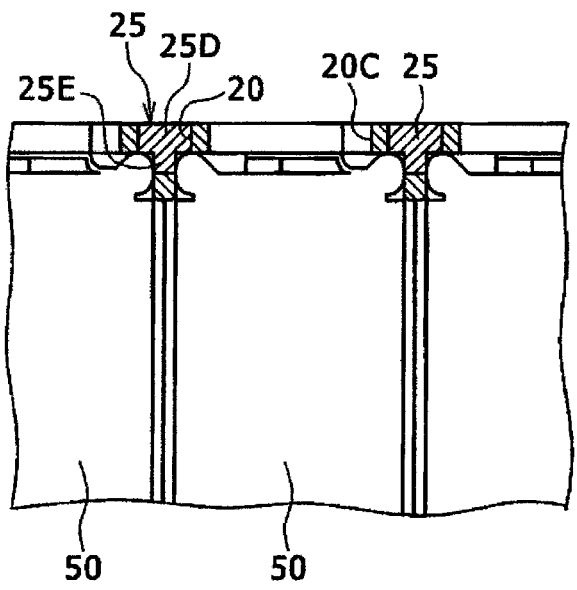
FIG. 5 is a side cross-sectional view of a groove representing an upper support member.

The upper support member 25 will be described with reference to FIG. 5. FIG. 5 shows a cross-sectional view along line A1-A1 shown in FIG. 2 of the upper holder 20 with the upper support member 25.

The upper support member 25 between adjacent energy storage devices 50 supports the adjacent energy storage devices 50 together. The upper support member 25 is formed by filling the void 20V with the second material injected from the inlet of the upper holder 20 described above.

The upper support member 25 is made of the second material that is less likely to deform or melt with heat than the first material. A thermosetting resin is used as the second material. The thermosetting resin is a resin having a cross-linked structure that does not melt even when exposed to a high temperature of 600° C. or higher, and does not melt but carbonizes to keep the shape of the upper support member 25 even when exposed to a high temperature in the range of 800° C. to 1000° C., for example. Examples include thermosetting resins such as urethane resin, silicon resin, unsaturated polyester, epoxy resin, melamine resin, or phenolic resin.

The upper support member 25 has a generally T-shape in a side view and has a base 25D that is bridged over the top surfaces of the adjacent energy storage devices 50, and a standing portion 25E that stands on the base 25D and is inserted between the outer surfaces of the adjacent energy storage devices 50.

The base 25D is a section formed by filling the horizontal void of the void 20V with the second material. The base 25D is in contact with the top surfaces of the adjacent energy storage devices 50. The standing portion 25E is a portion formed by filling the vertical void of the void 20V with the second material. The standing portion 25E is in contact with the outer peripheries of the adjacent energy storage devices 50.

This configuration allows the thermally runaway energy storage device 50 and the adjacent energy storage devices 50 to be more easily aligned through the base 25D and the standing portion 25E than the configuration in which an upper support member 25 is provided for each adjacent energy storage device 50 in the direction in which the adjacent energy storage devices 50 face each other. The configuration also simplifies the work of placing the second material around the energy storage device 50 to form the upper support member 25. Bringing the upper support member 25 into a direct contact with the energy storage device 50 without the first material of the container 20A therebetween increases the reliability of its alignment in the event of thermal runaway of the energy storage device 50. The partition 20E has an opening in the surface facing the outer periphery of the energy storage device 50.

The advantageous effects of the energy storage module 10 will now be described. In the energy storage module 10, the upper holder 20 is made of the first material, and only the upper support member 25, which is a member of the upper holder 20, is made of the second material having the property of being less likely to deform or melt even when heated than the first material; and the lower holder 30 is made of the first material, and only a lower support member 35, which is a member of the lower holder 30, is made of the second material, thereby achieving smaller size and lighter weight than in the case where the upper holder 20 and the lower holder 30 are made of the first material.

In a conventional energy storage module, excess heat-conductive material would be allowed to escape into the gap between the energy storage devices. In other words, the energy storage module allows excess heat-conductive material to escape into an open space. For this reason, the amount of escaping heat-conductive paste cannot be limited in the energy storage module. In other words, it cannot absorb variations in the amount of heat-conductive material lying between the energy storage device and the heat-conductive sheet. As a result, variations occur in the distance from the energy storage device to the heat exchange member, the contact area between the energy storage device and the heat-conductive material, or the contact area between the heat-conductive material and the heat exchange member. Accordingly, the amount of heat dissipation from the energy storage device to the heat exchange member varies. The following describes an energy storage module that can suppress variations in the amount of heat dissipation from the energy storage device to the heat exchange member due to variations in the amount of application of heat-conductive material.

Figure 6:
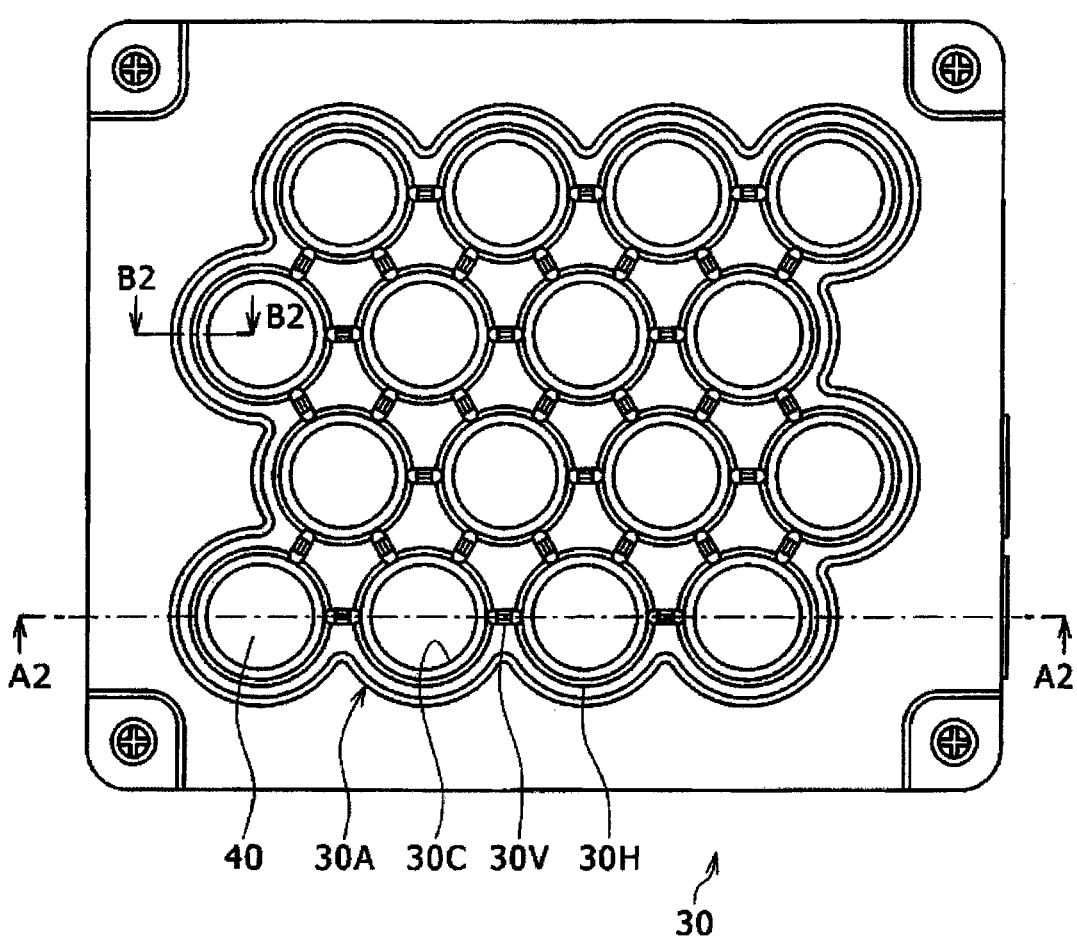
FIG. 6 is a plan view of a lower holder.
Figure 7:
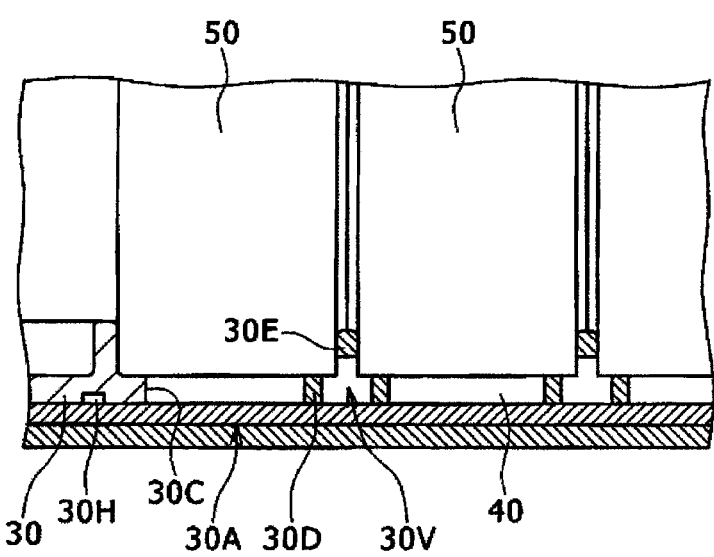
FIG. 7 is a side cross-sectional view of the lower holder.

The lower holder 30 will now be described with reference to FIGS. 6 and 7. FIG. 6 is a plan view of the lower holder 30. FIG. 7 is a cross-sectional view along line A2-A2 shown in FIG. 6. In FIGS. 6 and 7, the lower support member 35 is omitted for clarity of explanation.

The lower holder 30 has the lower support member 35, which will be described in detail later. The lower holder 30 is made of a first material. The description of the first material is omitted since it is the same as the first material for the upper holder 20. The lower holder 30 has multiple containers 30A into which portions at the other ends (lower end portions) of the respective energy storage devices 50 defined with respect to the axial direction are inserted. The container 30A has an opening 30C, the overhang 30B, a partition 30E, a void 30V, a groove (omitted in the drawing), and a recess 30H. The groove will be described in detail later.

The opening 30C is a through hole extending from the container 30A to the bottom surface of the lower holder 30, and is the portion filled with the heat-conductive material 40 of the energy storage device 50. The opening 30C has a circular shape, for example. An overhang 30D extends below the bottom surface of the energy storage device 50 to enclose the opening 30C. The overhang 30D is disposed around the opening 30C, facing the periphery of the bottom surface of the energy storage device 50. The overhang 30D is formed near the bottom surface of the energy storage device 50 and may be in contact with the bottom surface of the energy storage device 50. The partition 30E is formed along the outer periphery of the energy storage device 50. The partition 30E is formed near the outer periphery of the energy storage device 50 (outer can) and may be in contact with that outer periphery.

The void 30V is a space to be filled with the second material described above. The second material filled in the void 30V hardens to form the lower support member 35. Each void 30V lies between adjacent containers 30A. More precisely, it lies along an axis connecting the center lines of the adjacent containers 30A. The void 30V consists of a horizontal void formed by notching a portion of the overhang 30D, and a vertical void that is formed by notching the lower end portion of the partition 30E and communicates with the horizontal void.

The length of the horizontal void in the direction in which adjacent energy storage devices 50 are aligned is smaller than the gap between adjacent openings 30C and larger than the gap between the adjacent energy storage devices 50. The length of the horizontal void in the direction perpendicular to the axis in the horizontal plane is approximately the same as the gap between the adjacent energy storage devices 50. The length in the vertical direction of the vertical void is approximately the same as the gap between the adjacent energy storage devices 50.

The recess 30H is a portion where excess heat-conductive material 40 is contained. The recess 30H lies around the overhang 30D. The recess 30H has the shape of a step raised from the bottom surface of the overhang 30D. The recesses 30H in the respective containers 30A communicate with each other. Some of the recesses 30H are formed in the voids 30V and communicate with the respective voids 30V. Each recess 30H is formed on the bottom surface of the lower holder 30, away from the periphery of the opening 30C. This configuration allows the heat-conductive material 40 contained in the recesses 30H to be separated more accurately. Each recess 30H extends in the circumferential direction of the opening on the bottom surface so as to enclose the entire periphery of the opening. With this configuration, the excess heat-conductive material near the opening 30C can be contained in the recess 30H more accurately. Here, the bottom surface of the lower holder 30 in which the recess is formed refers to the outer surface of the lower holder 30 facing the heat exchange member, and does not necessarily refer to the surface at the bottom of the lower holder 30.

A recess 30H formed in the void 30V is defined by at least the void 30V or the lower support member 35. With this configuration, the void 30V can function as a space for accommodating the lower support member 35 and contain the heat-conductive material 40 as the recess 30H. Therefore, the lower support member 35 may be disposed so as to occupy a part of the void 30V. In the present disclosure, each recess 30H does not necessarily contain the heat-conductive material 40, as the recess 30H can possibly contain the heat-conductive material 40 when excess heat-conductive material 40 is generated.

Figure 8:
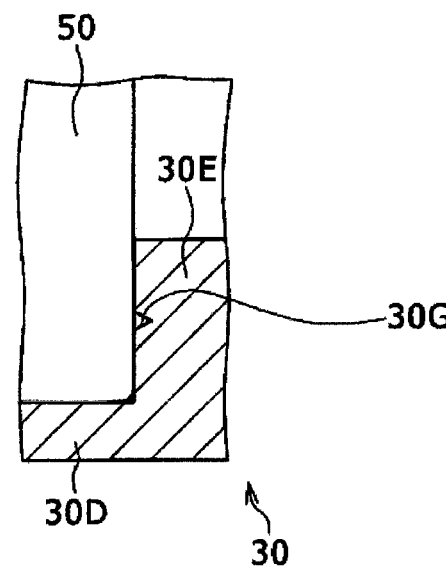
FIG. 8 is a side cross-sectional view of a groove of the lower holder.

A groove 30G formed in the lower holder 30 will be described with reference to FIG. 8. FIG. 8 is a cross-sectional view along line B2-B2 shown in FIG. 6, and is a cross-sectional schematic view showing a portion near the container 30A of the lower holder 30 and the peripheral edge of the other end of the energy storage device 50.

As shown in FIG. 8, the groove 30G is a space into which the second material filled in the void 30V flows. The second material flowing into the groove 30G acts as an adhesive to bond and fix the energy storage device 50 and the lower holder 30 together. The groove 30G lies along the circumferential direction of the energy storage device 50 on the surface facing the outer periphery of the energy storage device 50 of the partition 30E. In addition, the groove 30G communicates with the void 30V.

With this configuration, at the time when the void 30V is filled with the second material, part of the second material from the void 30V can enter the generally annular void defined by this groove 30G and the outer periphery of the outer can. Consequently, the amount of the second material in contact with the energy storage device 50 increases in the circumferential direction of the energy storage device 50, and the lower support member 35 can support the energy storage device 50 more accurately. The cross-sectional shape of the groove 30G is, for example, a V-shape. In this embodiment, the groove 30G is formed on the surface facing the outer periphery of the energy storage device 50 of the partition 30E, but this is not necessarily the case. For example, the groove 30G may be formed on the surface facing the top surface of the energy storage device 50 of the overhang 30D.

Figure 9:
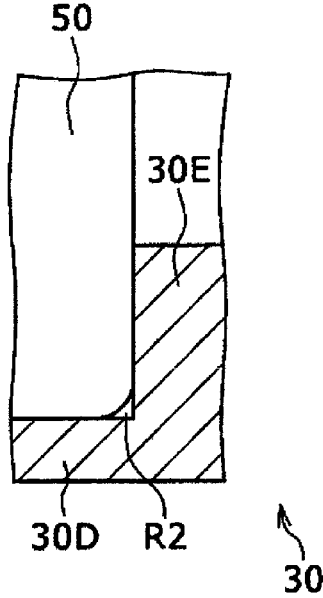
FIG. 9 is a side cross-sectional view of a lower holder which is another example of the embodiment.

A lower holder 30 that is another example of the embodiment will now be described with reference to FIG. 9. FIG. 9 is a cross-sectional view along line B2-B2 shown in FIG. 6 for the lower holder 30 of another embodiment.

The lower holder 30 has a corner formed by the overhang 30D and the partition 30E. The corner forming the bottom surface and the outer periphery of the energy storage device 50 (or the outer can) are R-shaped. A space R2 formed by the corner of the lower holder 30 and the R-shaped portion of the energy storage device 50 communicates with the void 30V. As a result, the thermosetting resin in the void 30V flows into the space R2. The thermosetting resin flowing into the space R2 acts as an adhesive to bond and fix the energy storage device 50 and the lower holder 30 together.

Figure 10:
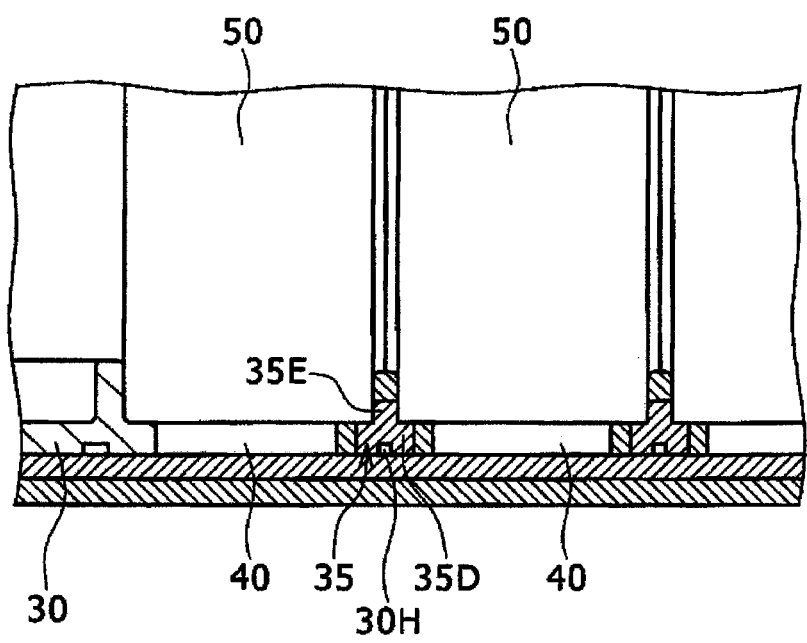
FIG. 10 is a side cross-sectional view of a lower support member.

The lower support member 35 and the heat-conductive material 40 will be described with reference to FIG. 10. FIG. 10 is a cross-sectional view along line B2-B2 shown in FIG. 6 of the lower holder 30 with the lower support member 35.

The lower support member 35 supports adjacent energy storage devices 50 together between the adjacent energy storage devices 50. The lower support member 35 is a filling in the void 30V of the lower holder 30 described above. The lower support member 35 is made of a second material. Thermosetting resin is used as the second material. The description of the second material for the lower holder 30 is omitted since it is the same as the second material for the upper holder 20.

The lower support member 35 has a generally T-shape in a side view and has a base 35D that is bridged over the bottom surfaces of the adjacent energy storage devices 50, and a standing portion 35E that is inserted between the outer peripheries of the adjacent energy storage devices 50.

Similarly to the upper support member 25, the base 35D is a section formed by filling the horizontal void of the void 30V with the second material. The base 35D is in contact with the top surfaces of the adjacent energy storage devices 50. The standing portion 35E that stands on the base 35D is a portion formed by filling the vertical void of the void 30V with the second material. The standing portion 35E is in contact with the outer peripheries of the adjacent energy storage devices 50.

At the time when the lower support member 35 is formed as a filling in the void 30V, the groove 30G is also filled with the lower support member 35 because the void 30V communicates with the groove 30G. As a result, the lower support member 35 can be used as a thermosetting resin adhesive to bond the lower holder 30 and the energy storage device 50 together.

The heat-conductive material 40 is a filling in the opening 30C of the lower holder 30. The energy storage device 50 is placed on the heat-conductive material 40 in the container 30A after the opening 30C is filled with the heat-conductive material 40. At this time, the excess heat-conductive material 40 flows into the gap between the overhang 30D of the lower holder 30 and the insulating layer 60, and is pushed toward the recess 30H and then contained in the recess 30H. This prevents the heat-conductive material 40 flowing into the gap between the overhang 30D of the lower holder 30 and the insulating layer 60 from staying in the gap between the overhang 30D and the insulating layer 60. The recess 30H in FIG. 10 is formed on the surface exposed from the opening of the void 30V of the lower support member 35.

Hence, variations in distance between the energy storage device 50 and the insulating layer 60 can be suppressed, and variations in heat transfer between each energy storage device 50 and the heat exchange member 70 can be suppressed. Each recess 30H may be positioned so as not to overlap with the energy storage devices 50 in the direction of the height of the energy storage devices 50. This configuration suppresses variations in heat transfer between the end surface of the energy storage device 50 (or the bottom of the outer can) and the heat exchange member 70, whether the heat-conductive material 40 is contained in the recess 30H or not.

The advantageous effects of the energy storage module 10 will now be explained. With the energy storage module 10, variations in the amount of heat dissipation from the energy storage devices 50 to the heat exchange member 70 due to variations in the amount of the heat-conductive material 40 applied can be suppressed.

Figure 16:
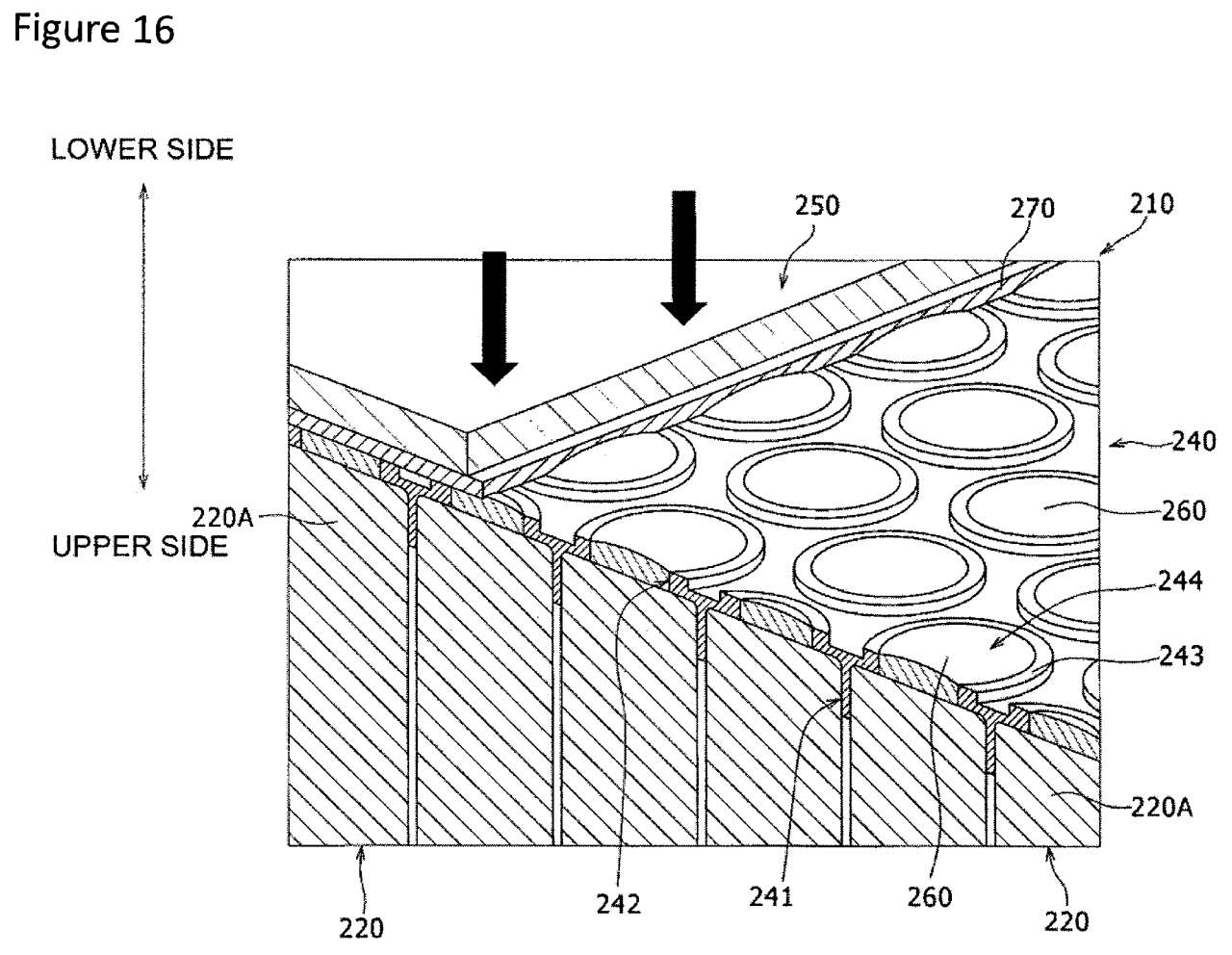

FIG. 16 is an oblique view of an energy storage module 210 viewed from below to explain a process for manufacturing the energy storage module 210, in which some of the components are shown in cross-sectional view.

In FIG. 16, the energy storage module 210 includes a lower holder 240 that holds lower end portions 220A of the energy storage devices 220, a heat exchange member 250 disposed below the lower holder 240, a heat-conductive material 260 that thermally connects the lower end portions 220A of the energy storage devices 220 to the heat exchange member 250, and an insulating layer 270 that electrically insulates the energy storage devices 220 from the heat exchange member 250.

The lower holder 240 has a container 241 for containing the lower end portions 220A of the energy storage devices 220, an opening 242 passing through from the container 241 downward, and a peripheral wall 243 formed on the bottom surface of the lower holder 240, that is, at the edge of the opening 242, and the heat-conductive material 260 is contained in the opening 242 and inside the peripheral wall 243 (hereinafter referred to as a filling section 244). The heat-conductive material 260 is, for example, a viscous fluid in the form of a gel that hardens after the lapse of a predetermined period of time.

In the process for manufacturing the energy storage module 210, the lower end portion 220A of each energy storage device 220 is contained in the container 241 of the lower holder 240, the heat-conductive material 260 is applied to the filling section 244 of the lower holder 240, the insulating layer 270 is interposed between the lower holder 240 and the heat exchange member 250, and the heat exchange member 250 is pressurized toward the lower holder 240. At this time, the heat-conductive material 260 is crushed and expanded in the filling sections 244, and the filling sections 244 are fully filled with the heat-conductive material 260. The amount of heat-conductive material 260 applied to each filling section 244 of the lower holder 240 is equal to the volume of the filling section 244 plus an excess amount.

When the heat exchange member 250 is pressurized toward the lower holder 240 in the process for manufacturing the energy storage module 210 described above, the excess heat-conductive material 260 may be discharged from the filling section 244 beyond the peripheral wall 243 to the outside of the peripheral wall 243. However, if the pressure acting on the filling section 244 is small, the excess heat-conductive material 260 is not always sufficiently discharged from the filling section 244. Besides, it is difficult to apply an equal pressure to multiple filling sections.

This may cause variations in the thickness (the size in the vertical direction) of the heat-conductive material 260, and variations in heat exhaust distance (distance from the lower end portion 220A of the energy storage device 220 to the heat exchange member 250) among the energy storage devices 220. Variations in heat exhaust distance make the heat exhaust performance of the energy storage devices 220 uneven, and degrade the overall heat exhaust performance of the energy storage modules 210.

An energy storage module 110 with reduced variations in the thickness of the heat-conductive material and improved heat exhaust performance will now be described.

Figure 11:
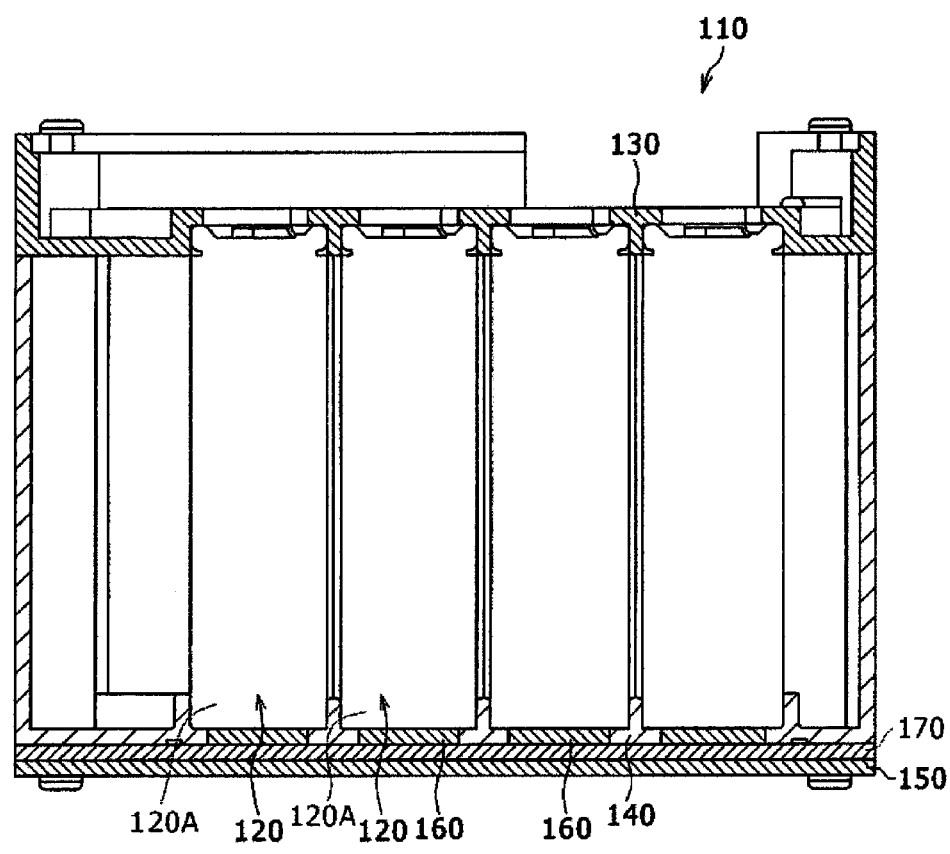
FIG. 11 is a side cross-sectional view of an energy storage module which is another example of the embodiment.

An energy storage module 110 of another example of the embodiment will now be described with reference to FIG. 11. FIG. 11 is a side cross-sectional view of the energy storage module 110.

The energy storage module 110 is used mainly as a power source for producing power. For example, the energy storage module 110 is used as a power source for motor-driven devices such as electric cars, power tools, power-assisted bicycles, electric motorcycles, electric wheelchairs, electric tricycles, or electric carts. However, the energy storage module 110 is not used for specified applications, and may be used as a power source for a variety of electrical devices, such as cleaners, radios, lighting devices, digital cameras, or video cameras, used indoors or outdoors.

The energy storage module 110 includes multiple cylindrical energy storage devices 120, an upper holder 130 that holds the upper end portions of the multiple energy storage devices 120, a lower holder 140 as a holder that holds lower end portions 120A of the multiple energy storage devices 120, a heat exchange member 150 that faces the bottom surface of the lower holder 140, a heat-conductive material 160 that thermally connects the energy storage devices 120 and the heat exchange member 150 together, and an insulating layer 170 that electrically insulates the energy storage devices 120 from the heat exchange member 150.

Each energy storage device 120 is a cylindrical lithium-ion secondary battery in this example, but may be a nickel metal hydride battery, a capacitor, or the like. The energy storage device 120 includes, for example, an electrode group in which a positive electrode strip and a negative electrode strip are coiled together with a separator strip therebetween, a cylindrical outer can containing the electrode group with an electrolyte, a sealing body that seals an opening of the outer can in an insulated state, a foil-like positive electrode lead that electrically connects the positive electrode to the sealing body, and a negative electrode lead that electrically connects the negative electrode to the outer can. An insulating gasket may be placed between the outer periphery of the sealing body and the inner periphery of the opening of the outer can.

An annular groove is formed on the outer periphery of the outer can on the opening side. This groove is formed as an annular protrusion on the inner periphery of the outer can. The gasket and the sealing body are placed on this annular protrusion in the outer can. In addition, an opening end of the outer can is swaged so that it falls toward the inside of the outer can while the gasket is placed inside. The opening of the outer can is sealed when the sealing body is sandwiched vertically between the swaged opening end and the protrusion through the gasket.

The sealing body may be provided with a current interruption mechanism (CID) or an exhaust valve that bursts when the pressure inside the outer can reaches a predetermined level or higher. An insulating plate may be provided between the electrode group and the bottom of the outer can or between the electrode group and the protrusion (groove) to insulate the electrode group from the outer can. In the case where an insulating plate is provided, the positive electrode lead may extend through a through hole formed in the insulating plate. The negative electrode lead may extend through the through hole formed in the insulating plate or bypass the insulating plate.

In the energy storage device 120, the positive electrode terminal is formed on the top surface of the sealing body, and the negative electrode terminal faces the upper end portion (swaged opening end) of the outer can. Note that the electrode group may be connected so that the outer can functions as the positive electrode terminal and the sealing body functions as the negative electrode terminal.

The multiple energy storage devices 120 are packed in the energy storage module 110 in the densest manner for safety reasons, and the adjacent energy storage devices 120 may be arranged almost close to each other. The energy storage devices 120 are arranged in such a way that, for example, six energy storage devices 120 surround one energy storage device 120 in a plan view. Note that the multiple energy storage devices 120 may be connected in series or parallel via conductive collector plates (not shown in the drawing). At this time, the location where the leads extending from the current collector plates are connected to the energy storage devices may be at the top surface of the sealing body as the positive electrode terminal and the swaged opening end of the outer can as the negative electrode terminal.

The upper holder 130 is a member that holds the upper end portions of the multiple energy storage devices 120 as described above. The upper holder 130 is made of, for example, a thermoplastic resin. Examples of thermoplastic resins include polyethylene, polypropylene, polyamide, and ABS, which are broadly classified into general-purpose plastics and engineering plastics.

The lower holder 140 is a member that holds the lower end portions 120A of the multiple energy storage devices 120 and also contains the heat-conductive material 160 as described above. Similarly to the upper holder 130, the lower holder 140 is made of a thermoplastic resin. The details of the shape of the lower holder 140 will be described later.

The heat exchange member 150 is a member that, for example, faces the bottom surface of the lower holder 140 and cools the lower end portions 120A of the energy storage devices 120. The heat exchange member 150, which is a metal plate having heat conductivity in this example, may be a water-cooled pipe, an air-cooled fin, a refrigerant cooling pipe, a panel heater, a sheet heater, or the like instead.

The heat-conductive material 160 is a member that is interposed between each energy storage device 120 and the heat exchange member 150 and also thermally connects each energy storage device 120 to the heat exchange member 150. The heat-conductive material 160 is a viscous fluid in the form of a gel that hardens after a predetermined period of time. In this example, the heat-conductive material 160 is silicon, a two-component hardening material, containing a metal oxide (e.g., aluminum oxide or zinc oxide), metal nitride (e.g., aluminum nitride or boron nitride), metal oxynitride (e.g., aluminum oxynitride), or the like.

The insulating layer 170 is a sheet-like member that is interposed between the lower end portions 120A of the energy storage devices 120 and the heat exchange member 150 and also insulates the energy storage devices 120 from the heat exchange member 150. The insulating layer 170 is a silicon sheet containing a heat-conductive filler in this example, but this is not necessarily the case.

Figure 12:
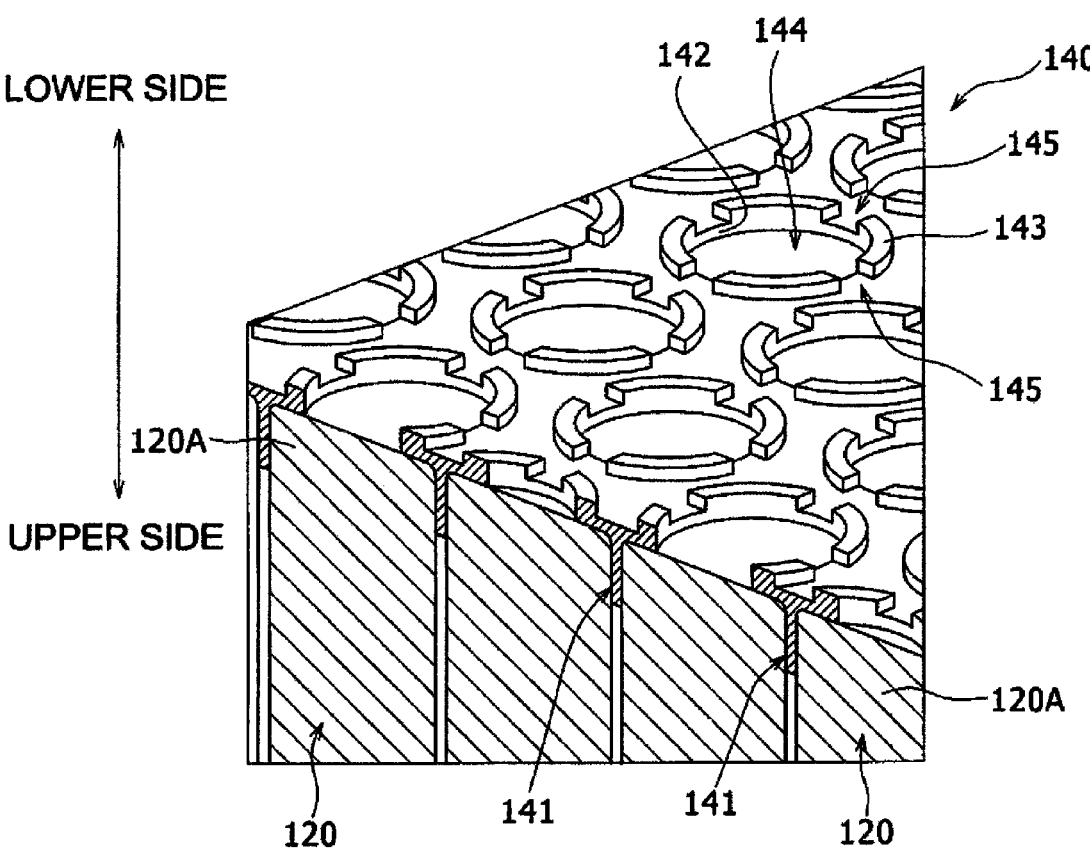
FIG. 12 is an oblique view of the lower holder viewed from the bottom.

The shape of the lower holder 140 will be described with reference to FIG. 12. FIG. 12 is an oblique view of the lower holder 140 from the bottom, in which the member is partially shown in a cross-sectional view.

Figure 13:
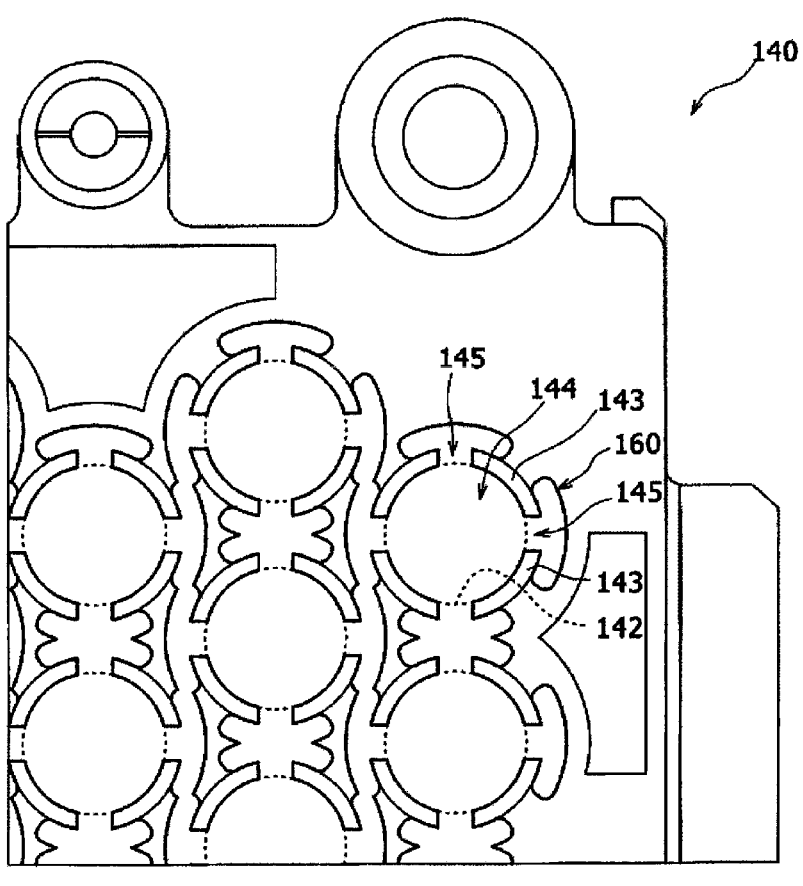
FIG. 13 is a bottom view of a heat-conductive material contained in the lower holder, viewed from below.
Figure 14:
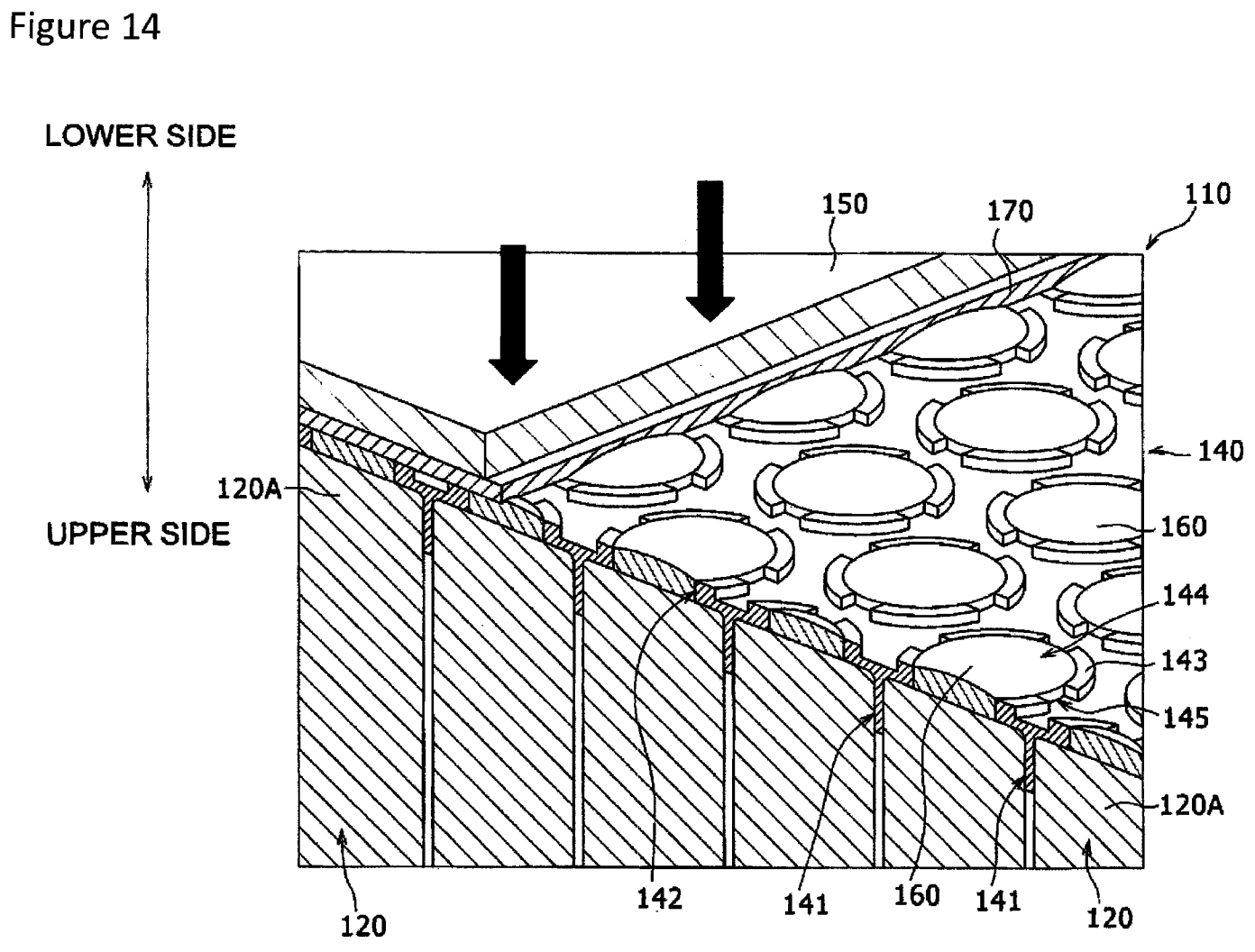

As shown in FIG. 12, the lower holder 140 holds the lower end portions 120A of the multiple energy storage devices 120 and also contains the heat-conductive material 160 (see FIGS. 13 and 14). The lower holder 140 has at least one container 141 containing the lower end portion 120A of at least one energy storage device 120, an opening 142 passing through from the at least one container 141 downward, and at least one peripheral wall 143 formed at the edge of the opening 142 at the bottom of the lower holder 140.

Multiple containers 141 are formed on the bottom surface of the lower holder 140 to contain the lower end portions 120A of the energy storage devices 120. Since the lower end portions 120A of the energy storage devices 120 are contained in the containers 141, the lower end portions 120A of the energy storage devices 120 are held in the lower holder 140. In this embodiment, the lower end portions 120A of the energy storage devices 120 are the bottom of the outer can, but the energy storage module of the present disclosure does not necessarily have this configuration. For example, the lower end portions 120A may be located on the sealing plate side.

The opening 142 is a circular opening in the bottom surface of the container 141. The opening 142 allows the bottom surface of a corresponding energy storage device 120 to be exposed, so that the energy storage device 120 and the heat-conductive material 160 are thermally connected. The diameter of the opening 142 is smaller than the diameter of the bottom surface.

The peripheral wall 143 is a section formed at the edge of the opening 142 at the bottom of the lower holder 140. The peripheral wall 143 defines a space (a filling section 144 described later) to contain the heat-conductive material 160 together with the opening 142. The peripheral wall 143 has a convex shape projecting downward along the opening 142. The peripheral wall 143 has multiple notches 145, which will be described later.

Here, the space inside the opening 142 and the peripheral wall 143 is supposed to be the filling section 144. The filling section 144 is capable of containing the heat-conductive material 160 to thermally connect the lower end portion 120A of the energy storage device 120 to the heat exchange member 150. To be specific, the filling section 144 is defined by the bottom surface of the energy storage device 120, the ceiling surface of the insulating layer 170, and the inner periphery of the opening 142 and the peripheral wall 143. In each filling section 144, the hole defined by the inner periphery of the opening 142 and the inner periphery of the peripheral wall 143 may have the same shape and size. This configuration facilitates the formation of the openings and the peripheral walls. It also facilitates the positioning of the peripheral walls on the bottom surface of the lower holder 140.

Each notch 145 is formed by cutting off a portion of the peripheral wall 143. As will be described in detail below, the notch 145 allows excess heat-conductive material 160 to be discharged to the outside of the peripheral wall 143 during manufacturing of the energy storage module 110. The notch 145 is formed so as to provide communication between the outside and the inside of the peripheral wall 143.

In this example, multiple notches 145 are formed at approximately equal intervals in the circumferential direction of the peripheral wall 143. The notches 145 allow excess heat-conductive material 160 to be discharged to the outside of the peripheral wall 143 approximately equally in the circumferential direction. This reduces variations in the amount of excess heat-conductive material 160 discharged in the circumferential direction of the filling section 144. In this example, four notches 145 are formed at 90° intervals in the circumferential direction, which is not necessarily the case. The notches 145 extend in the direction of the height of the peripheral wall 143 (vertical direction) in this example. The size in the height direction of each notch 145 is the same as the size in the height direction of each peripheral wall 143 (the size in the height direction of the outer periphery of each peripheral wall 143). This configuration allows excess heat-conductive material 160 to be easily pushed out of the peripheral wall 143. However, the notches 145 of the present disclosure do not necessarily have this configuration. The size of the notch 145 in the height direction may be smaller than the size of the peripheral wall 143 in the height direction. In this case, the peripheral wall 143 is unnotched and annular in the circumferential direction.

The shape of the heat-conductive material 160 will now be described with reference to FIG. 13. FIG. 13 is a bottom view of the heat-conductive material 160 contained in the lower holder 140, viewed from below. In FIG. 13, the heat-conductive material 160 is contained in the filling section 144. The amount of heat-conductive material 160 applied to each filling section 144 in the manufacturing process described below is equal to the volume of that filling section 144 plus an excess amount. The excess heat-conductive material 160 extends out outside the peripheral wall 143, especially to the vicinity of the notch 145 outside the peripheral wall 143.

A process for manufacturing the energy storage module 110 will now be explained with reference to FIG. 14. FIG. 14 is an oblique view of the energy storage module 110 viewed from below to explain a process for manufacturing the energy storage module 110, in which some components are shown in a cross-sectional view.

As shown in FIG. 14, in the process for manufacturing the energy storage module 110, the energy storage devices 120 are contained in the lower holder 140, the heat-conductive material 160 is applied to the filling sections 144 of the lower holder 140, the insulating layer 170 is interposed between the lower holder 140 and the heat exchange member 150, and the heat exchange member 150 is pressurized toward the lower holder 140. At this time, the heat-conductive material 160 is crushed and expanded in the filling sections 144, and the filling sections 144 are fully filled with the heat-conductive material 160. In the present invention, each filling section 144 should not necessarily be fully filled with the heat-conductive material 160. However, the smaller the gaps, the higher the thermal conductivity of the heat-conductive material 160. When the heat exchange member 150 is fixed to the lower holder 140 through a fixer (not shown in the drawing), the end of each peripheral wall 143 in the height direction (vertical direction) may be in contact with the heat exchange member 150 (or the insulating layer 170, if the insulating layer 170 is provided). In other words, the end of each peripheral wall 143 may be in direct or indirect contact with the heat exchange member 150. This configuration facilitates adjustment of the heat exhaust distance between each energy storage device 120 and the heat exchange member 150. To be in contact with the heat exchange member 150, the end of each peripheral wall 143 may be the lowest at the bottom surface of the lower holder 140.

As described above, the amount of heat-conductive material applied to each filling section 144 of the lower holder 140 is equal to the volume of that filling section 144 plus an excess amount. For this reason, in the energy storage module, the total volume of the heat-conductive material may be larger than the total volume of the filling section (the space in the opening 142 and the space inside the peripheral wall 143). In the stage of pressurizing the heat exchange member 150 toward the lower holder 140, the heat-conductive material 160 is a viscous fluid.

When the heat exchange member 150 is pressurized toward the lower holder 140, excess heat-conductive material 160 is discharged from the filling sections 144 beyond the peripheral walls 143 to the outside of the peripheral walls 143. At the same time, the excess heat-conductive material 160 is also discharged from the notches 145 of the peripheral walls 143 to the outside of the peripheral walls 143.

As a result, the excess heat-conductive material 160 is sufficiently discharged from the filling sections 144, eliminating variations in the thickness (size in the vertical direction) of the heat-conductive material 160, and suppressing variations in heat exhaust distance (distance from the lower end portion 120A of the energy storage device 120 to the heat exchange member 150) among the energy storage devices 120. As a result, variations in the heat dissipation performance among the energy storage devices 120 are suppressed, and the heat exhaust performance of the energy storage module 110 is improved.

Figure 15:
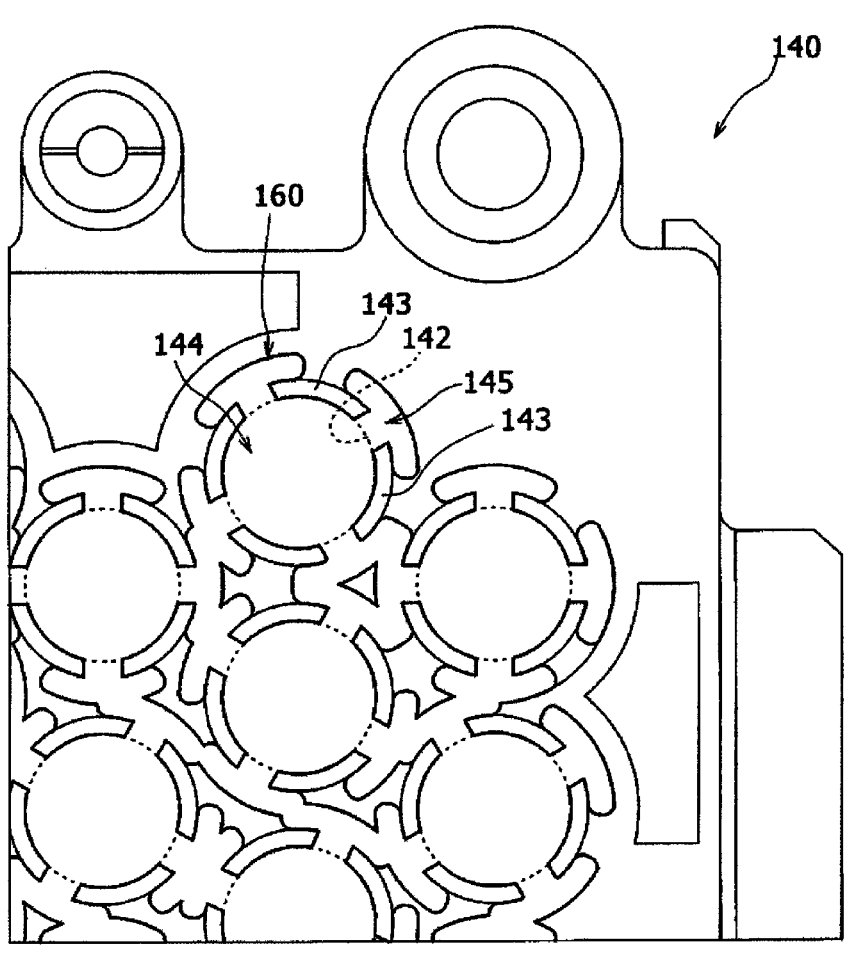
FIG. 15 is a bottom view of the lower holder of the energy storage module, viewed from below.

A lower holder 140 of the energy storage module 110 of another example of the embodiment will now be described with reference to FIG. 15. FIG. 15 is a bottom view of the lower holder 140 from below.

As shown in FIG. 15, the lower holder 140 has, as described above, openings 142 passing through from the container 141 downward, and peripheral walls 143 at the edges of the openings 142 on the bottom surface of the lower holder 140. Each peripheral wall 143 has multiple notches 145.

Each notch 145 is formed by cutting off a portion of the peripheral wall 143 and formed so as to provide communication between the outside and inside of the peripheral wall 143, as described above. The notch 145 in this example may be formed in a portion along the circumferential direction of the peripheral wall 143, except the portion of that peripheral wall 143 near the adjacent peripheral walls 143. In other words, the notch 145 may be formed in a portion in the circumferential direction of the peripheral wall 143, except the portion of that peripheral wall 143 that is closest to the adjacent peripheral walls 143. For example, the notch 145 is formed in such a way that it provides communication to a wide area outside the peripheral wall 143. The wide area is defined as an area where the spacing between the adjacent peripheral walls 143 is at least 220% greater than the narrowest spacing. The narrowest spacing is the spacing with which the adjacent peripheral walls 143 are closest to each other.

Even with the notches 145 of this example, when the heat exchange member 150 is pressurized toward the lower holder 140 during the process for manufacturing the energy storage module 110, excess heat-conductive material 160 is easily discharged from the notches 145 of the peripheral walls 143 to the outside of the peripheral walls 143 as well. In addition, the notch 145 in this example, allows excess heat-conductive material 160 to be discharged into a wide area outside the peripheral wall 143, so that discharge of the heat-conductive material 160 is less likely to be obstructed by the adjacent peripheral walls 143, and the excess heat-conductive material 160 is smoothly discharged.

As a result, the excess heat-conductive material 160 is sufficiently discharged from the filling sections 144, further suppressing variations in the thickness (size in the vertical direction) of the heat-conductive material 160 and variations in heat exhaust distance among the energy storage devices 120. As a result, variations in heat exhaust performance among the energy storage devices 120 are suppressed, and the heat exhaust performance of the energy storage module 110 is improved.

The energy storage module 110 may have multiple energy storage devices 120, multiple containers 141, and multiple peripheral walls, and the heat exchange member 150 and the lower holder 140 may be fixed together with a fixer (not shown in the drawing). If there are a peripheral wall (first peripheral wall) that is closer to the fixer and a peripheral wall (second peripheral wall) that is remote from the fixer, the peripheral wall that is closer to the fixer may have a smaller amount of notch (larger volume of peripheral wall) than the peripheral wall that is remote from the fixer, or no notches. This configuration makes it easier for the heat-conductive material in the filling section remote from the fixer to be pushed out due to variations in the force from the heat exchange member 150. Fixing means of the fixer can be, but is not limited to, fastening by screws and screw holes.

REFERENCE SIGNS LIST

10 Energy storage module, 20 Upper holder, 20A Container, 20C Opening, 20D Overhang, 20E Partition, 20F Connection hole, 20G Groove, 20V Void, 25 Upper support member (first support member), 25D Base, 25E Standing portion, 30 Lower holder, 30A Container, 30B Overhang, 30C Opening, 30D Overhang, 30E Partition, 30G Groove, 30H Recess, 30V Void, 35 Lower support member (second support member), 35D Base, 35E Standing portion, 40 Heat-conductive material, 50 Energy storage device, 110 Energy storage module, 120 Energy storage device, 120A Lower end portion, 130 Upper holder, 140 Lower holder, 141 Container, 142 Opening, 143 Peripheral wall, 144 Filling section, 145 Notch, 150 Heat exchange member, 160 Heat-conductive material, 1200 Energy storage module, 220 Energy storage device, 220 Bottom, 240 Lower holder, 241 Opening, 242 Peripheral wall, 244 Filling section, 250 Heat exchange member, 260 Heat-conductive material.

The invention claimed is:

1. An energy storage module comprising:

an array of multiple cylindrical energy storage devices; and a first holder that holds an end portion, located on one side, of each of the multiple energy storage devices and has multiple first containers made of a first material, wherein:

the first holder includes a first support member that is located between two adjacent energy storage devices of the multiple energy storage devices to support the two adjacent energy storage devices, and that is made of a second material, the second material has a property of being less likely to deform or melt even when heated than the first material, the first support member comprises a first face and a second face opposite to the first face in an arrangement direction that is a direction in which the two adjacent energy storage devices are arranged, the first face supporting a first energy storage device of the two adjacent energy storage devices and the second face supporting a second energy storage device of the two adjacent energy storage devices in the arrangement direction, and the first support member has a base that is bridged over end surfaces, located on one side, of the adjacent energy storage devices, and a standing portion that stands on the base and is inserted between the outer peripheries of the adjacent energy storage devices.

2. The energy storage module according to claim 1, wherein the first support member is in contact with an end surface, located on one side, of each of the adjacent energy storage devices.

3. The energy storage module according to claim 2, wherein each of the multiple energy storage devices comprises an electrode group that includes a first electrode and a second electrode, a cylindrical outer can that contains the electrode group with an electrolyte, and a sealing body that seals an opening of the outer can while being electrically insulated from the outer can, the sealing body is electrically connected to the first electrode, the outer can is electrically connected to the second electrode, and the end surface, located on the one side, is the top surface of the sealing body.

4. The energy storage module according to claim 1, wherein the first support member is in contact with an outer periphery of each of the adjacent energy storage devices.

5. An energy storage module comprising:

an array of multiple cylindrical energy storage devices; and a first holder that holds an end portion, located on one side, of each of the multiple energy storage devices and has multiple first containers made of a first material, wherein:

the first holder includes a first support member that is located between two adjacent energy storage devices of the multiple energy storage devices to support the two adjacent energy storage devices, and that is made of a second material, the second material has a property of being less likely to deform or melt even when heated than the first material, the first support member comprises a first face and a second face opposite to the first face in an arrangement direction that is a direction in which the two adjacent energy storage devices are arranged, the first face supporting a first energy storage device of the two adjacent energy storage devices and the second face supporting a second energy storage device of the two adjacent energy storage devices in the arrangement direction, the first support member is disposed in a void formed in the first holder, and in the first container of the first holder, a groove is formed in a surface facing the energy storage device along a circumferential direction of the energy storage device, the groove communicates with the void, and the second material is disposed in the groove.

6. The energy storage module according to claim 5, wherein a diameter of an end portion, located on one side, of the energy storage device is smaller than a diameter of another portion of the energy storage device.

7. The energy storage module according to claim 6, wherein an inner periphery of the first container of the first holder is in contact with an outer periphery of a portion of the energy storage device having a larger diameter.

8. The energy storage module according to claim 5, wherein an outer surface of the first holder has an injection hole that communicates with the void.

9. The energy storage module according to claim 5, wherein the void is defined by the first holder and outer surfaces of the adjacent energy storage devices.

10. An energy storage module comprising:

multiple cylindrical energy storage devices, each of the multiple energy storage devices having a first terminal and a second terminal at an end portion located on one side, the multiple energy storage devices being arranged so that the end portions, located on the one side, are aligned on the same side; and a second holder that holds the other side of each of the multiple energy storage devices and is made of a first material, wherein:

the second holder includes a second support member that is located between two adjacent energy storage devices of the multiple energy storage device and supports the two adjacent energy storage devices together between the two adjacent energy storage devices and is made of a second material, the second material has a property of being less likely to deform or melt even when heated than the first material, the second support member comprises a first face and a second face opposite to the first face in an arrangement direction that is a direction in which the two adjacent energy storage devices are arranged, the first face supporting a first energy storage device of the two adjacent energy storage devices and the second face supporting a second energy storage device of the two adjacent energy storage devices in the arrangement direction, the second support member is disposed in a void formed in the second holder, and in the second holder, a groove is formed in a surface facing the energy storage device along a circumferential direction of the energy storage device, the groove communicates with the void, and the second material is disposed in the groove.

* * * * *